(12) United States Patent
Terada (10) Patent No.: US 10,353,392 B2
(45) Date of Patent: Jul. 16, 2019

(54) AUTONOMOUS MOVING BODY AND MOVEMENT CONTROL METHOD OF AUTONOMOUS MOVING BODY (71) Applicant: TOYOTA JIDOSHA KABUSHIKI KAISHA, Toyota-shi, Aichi-ken (JP)

(72) Inventor: Koji Terada, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 47 days.

(21) Appl. No.: 15/622,828

(22) Filed: Jun. 14, 2017

(65) Prior Publication Data
US 2018/0011493 A1 Jan. 11, 2018

(30) Foreign Application Priority Data

Jul. 7, 2016 (JP) ................. 2016-135106

(51) Int. Cl.
*G01C 22/00* (2006.01)
*G05D 1/02* (2006.01)
*B25J 5/00* (2006.01)
*B62D 61/08* (2006.01)

(52) U.S. Cl.
CPC .............. *G05D 1/021* (2013.01); *B25J 5/007* (2013.01); *B62D 61/08* (2013.01)

(58) Field of Classification Search
CPC ................. G05D 1/021; G05D 1/0272; G05D 2201/0215; B25J 5/007; B62D 61/08; A47L 11/4011; A47L 11/4061; A47L 11/4066
USPC ............................... 701/23; 15/319; 700/253
See application file for complete search history.

(56) References Cited

U.S. PATENT DOCUMENTS

| 2013/0081218 A1* | 4/2013 | Kim ................. A47L 9/009 15/21.1 |
| 2013/0096717 A1* | 4/2013 | Yoon ................. A47L 11/33 700/245 |
| 2015/0150429 A1* | 6/2015 | Yoo ................. A47L 11/4011 173/1 |
| 2016/0059408 A1 | 3/2016 | Isobe |

FOREIGN PATENT DOCUMENTS

| JP | 2004-131017 A | 4/2004 |
| JP | 2006-190105 A | 7/2006 |
| JP | 2012-081941 A | 4/2012 |
| JP | 2016-049616 A | 4/2016 |
| JP | 2016-062441 A | 4/2016 |

OTHER PUBLICATIONS

Wada, "Omnidirectional Motion Control and Prototyping of a Four-Wheel-Drive Electric Wheelchair", Journal of the Robotics Society of Japan, vol. 27, No. 3, pp. 314-324(56-66), 2009.

\* cited by examiner

*Primary Examiner* — Shardul D Patel
(74) *Attorney, Agent, or Firm* — Oliff PLC (57) ABSTRACT

Provided is an autonomous moving body that controls driving wheels by allowing a trailing caster to be located on a front side with respect to a traveling direction when it is recognized that there is no step in a traveling direction and controls the driving wheels to change the orientation of a base body in which the driving wheels and the trailing caster are arranged and approach the step so that at least one of two driving wheels contacts the step before the trailing caster contacts the step when it is recognized that there is a step in the traveling direction.

10 Claims, 10 Drawing Sheets

AUTONOMOUS MOVING BODY AND MOVEMENT CONTROL METHOD OF AUTONOMOUS MOVING BODY

CROSS REFERENCE TO RELATED APPLICATIONS

This application is based upon and claims the benefit of priority from Japanese patent application No. 2016-135106, filed on Jul. 7, 2016, the disclosure of which is incorporated herein in its entirety by reference.

TECHNICAL FIELD

The present invention relates to an autonomous moving body and a movement control method of the autonomous moving body.

BACKGROUND

An autonomous moving body that includes a cart including a pair of driving wheels and a trailing wheel is known. Since the driving wheels are driven independently from each other, the autonomous moving body is able to move straight ahead or turn. Further, an omnidirectional moving vehicle that lifts wheels by a link mechanism to pass over a step is known (for example, Japanese Unexamined Patent Application Publication No. 2004-131017).

SUMMARY

When the cart including the pair of driving wheels and the trailing wheel is controlled as an omnidirectional cart, an active caster system in which the trailing wheel is located at the front in a traveling direction is effective. In the active caster control, however, surmountability, which is a property for crossing over a step on a traveling path, is low. On the other hand, when a complex mechanism is employed in the wheels in order to improve the surmountability, maintainability is reduced.

The present invention has been made in order to solve the aforementioned problem and aims to improve the surmountability of the autonomous moving body.

An autonomous moving body according to a first aspect of the present invention includes: two driving wheels that are rotationally driven independently from each other; at least one trailing caster; a base body in which the two driving wheels and the trailing caster are disposed; a controller that controls the rotational driving of the driving wheels; and an acquisition unit that acquires information on a step on a traveling path; in which the controller controls the driving wheels by allowing the trailing caster to be located on a front side of the base body with respect to a traveling direction when the controller has recognized as a result of the acquisition of the information by the acquisition unit that there is no step in the traveling direction, and controls the driving wheels to change the orientation of the base body and approach the step so that at least one of the two driving wheels contacts the step before the trailing caster contacts the step when the controller has recognized that there is a step in the traveling direction.

A movement control method of an autonomous moving body according to a second aspect of the present invention is a movement control method of an autonomous moving body including two driving wheels that are rotationally driven independently from each other, at least one trailing caster, and a base body in which the two driving wheels and the trailing caster are disposed, the method including: acquiring information on a step on a traveling path; and controlling the driving wheels by allowing the trailing caster to be located on a front side of the base body with respect to a traveling direction when the controller has recognized as a result of the acquisition of the information that there is no step in the traveling direction, and controls the driving wheels to change the orientation of the base body and approach the step so that at least one of the two driving wheels contacts the step before the trailing caster contacts the step when the controller has recognized that there is a step in the traveling direction.

According to the structures of the respective aspects, during the normal traveling other than the case in which the moving body passes over the step, the positional relation between the two driving wheels and the trailing caster is not constrained, whereby the moving body can be moved omnidirectionally and the number of options for moving paths that may be employed increases. That is, the degree of freedom of movement is greatly improved. On the other hand, when the moving body passes over the step, the driving wheels are located on the front side and the driving wheels try to pass over the step before the caster passes over the step. Accordingly, the propulsion force needed to pass over the step can be reduced and it is thus possible to smoothly pass over the step. That is, the surmountability with respect to the step is improved.

According to the present invention, it is possible to improve the surmountability of the autonomous moving body.

The above and other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

While the present invention will be described below with reference to an embodiment of the present invention, the invention set forth in Claims is not limited to the following embodiment. Further, not all the structures described in the embodiment may be necessary as the means for solving the problem.

Figure 1:
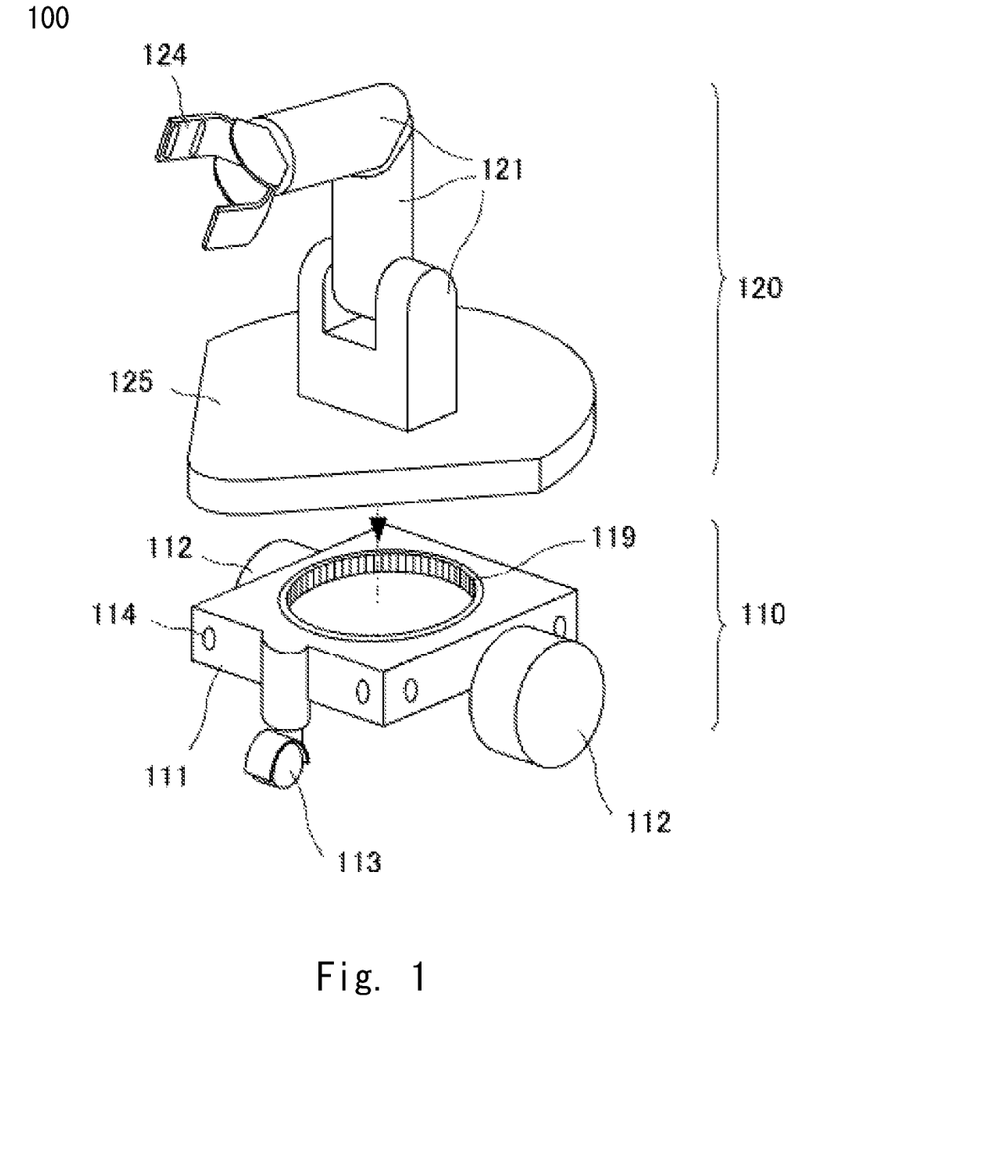
FIG. 1 is an external perspective view showing a part of a moving robot according to an embodiment in an exploded view.

FIG. 1 is an external perspective view showing a part of a moving robot according to this embodiment in an exploded view. A moving robot 100, which is an autonomous moving body, is mainly composed of a cart part 110 and an upper body part 120. FIG. 1 shows a state in which the upper body part 120 is lifted up a little from the cart part 110.

The cart part 110 is mainly composed of a cart base 111 that forms a quadrangle when it is seen from above, and two driving wheels 112 and one caster 113 attached to the cart base 111. The cart base 111 serves as a base-body of the cart part 110 and has, for example, a frame structure. The two driving wheels 112 are disposed on the respective side parts of the cart base 111 opposed to each other in such a way that the rotational axes thereof match each other. The driving wheels 112 are rotationally driven independently from each other by a motor (not shown). The caster 113 is a trailing wheel and is disposed so that a turning axis extending in the vertical direction from the cart base 111 supports the wheels so that there is some space between it and the rotation axes of the wheels, and serves as a trailing caster that tracks in accordance with a moving direction of the cart part 110. The moving robot 100 travels straight ahead when, for example, the two driving wheels 112 are rotated at the same rotational speed in the same direction and turns around the vertical axis that passes the center of gravity when the two driving wheels 112 are rotated at the same rotational speed in the opposite directions. That is, the moving robot 100 is able to move forward, move rearward, or turn by controlling the rotational direction and the rotational speed of each of the two driving wheels 112.

The cart part 110 includes various sensors for sensing an obstacle and recognizing an ambient environment. A camera 114 is one of the sensors and one is provided in each of the four corners of the cart base 111. The camera 114 includes, for example, a CMOS image sensor which sends an image signal that has been captured to a controller that will be described later. When two adjacent cameras 114 capture the same obstacle, it is possible to acquire parallax images and to calculate the distance to the obstacle as well. Further, the size of the obstacle may be calculated using the proportion of the image of the obstacle to the angle of view and the distance that has been calculated. According to such an operation, the height of a step that exists on the traveling path can be calculated as well.

A turning mechanism 119 is provided at the center portion of an upper surface of the cart base 111. A fitting part (not shown) of an upper body base 125 that constitutes the upper body part 120 is fitted into the turning mechanism 119 and the upper body base 125 is thus placed on the cart base 111. The upper body base 125 is rotatably driven about the vertical axis via the turning mechanism 119 by a motor (not shown) provided in the cart base 111. In this embodiment, an explanation will be given assuming that the center of gravity of the moving robot 100 is on the turning axis of the turning mechanism 119 and a pivot turn (turning on site) when the driving wheels 112 are driven at the same speed but in the opposite directions is performed around the same axis as the turning axis of the turning mechanism 119. When the turning axis of the turning mechanism 119 and the turning axis of the pivot turn are deviated from each other, translational components of the driving wheels 112 may be adjusted in consideration of the offset amount.

The upper body part 120 mainly includes, besides the upper body base 125, a plurality of arms 121 and a hand 124. The plurality of arms 121 are connected to one another so that they turn at the respective ends thereof. The base end side of the series of arms 121 is fixed to the upper body base 125 and the tip end side thereof rotatably supports the hand 124. The hand 124 includes a carrying mechanism so that the hand 124 is able to carry an object. The arms 121 and the hand 124 are driven via a motor (not shown) and each take a predetermined posture and carry the object.

Figure 2:
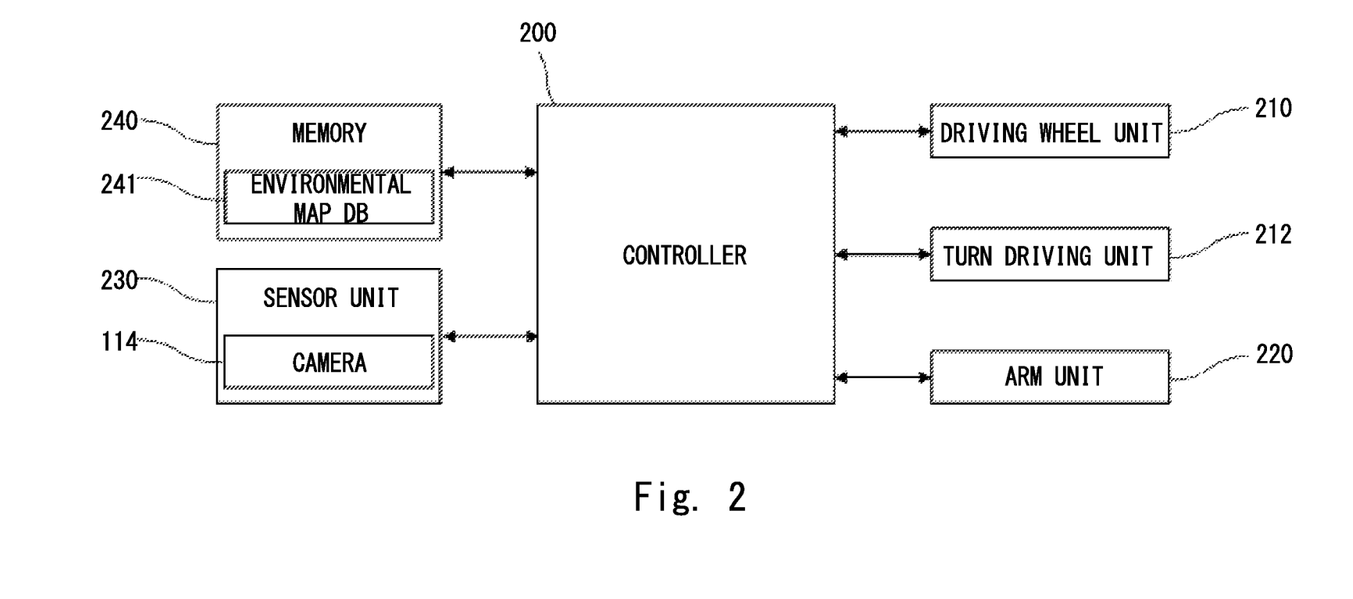
FIG. 2 is a control block diagram of the moving robot.

FIG. 2 is a control block diagram of the moving robot 100. A controller 200 is, for example, a CPU, and is provided in the cart part 110. A driving wheel unit 210 includes a driving circuit and a motor for driving the driving wheels 112 and is provided in the cart part 110. The controller 200 executes rotation control of the driving wheels 112 by sending a driving signal to the driving wheel unit 210.

A turn driving unit 212 includes a driving circuit or a motor for rotatably driving the upper body base 125 and is provided in the cart part 110. The controller 200 executes turning control of the upper body base 125 by sending a driving signal to the turn driving unit 212. When the upper body base 125 is turned, the whole upper body part 120, including the object held by the hand 124, is turned around the vertical axis. Further, when the drive of the driving wheels 112 causes the cart part 110 to be turned with respect to the road surface, the controller 200 may turn the upper body base 125 in a reverse direction in synchronization with the turn of the cart part 110, whereby the whole upper body part 120 does not superficially rotate around the vertical axis with respect to the road surface and the posture can be relatively maintained.

An arm unit 220 includes a driving circuit and a motor for driving the arms 121 and the hand 124 and is provided in the upper body part 120. The controller 200 executes posture control and carrying control of the upper body part 120 by sending a driving signal to the arm unit 220.

A sensor unit 230 includes various sensors for searching for the ambient environment and monitoring the posture of the upper body part 120 and is arranged in the cart part 110 and the upper body part 120 in a dispersed manner. The controller 200 sends a control signal to the sensor unit 230, to thereby drive various sensors and acquire output from the sensors. The camera 114 is included in the sensor unit 230 and executes an image-capturing operation in accordance with the control signal.

A memory 240 is a non-volatile storage medium and may be, for example, a solid state drive. The memory 240 stores, besides a control program for controlling the moving robot 100, various parameter values, functions, look-up tables used for control. The memory 240 includes an environmental map DB 241 that stores an environmental map which expresses an environment in which the moving robot 100 autonomously travels.

The controller 200 also serves as a function operation unit that executes various operations regarding control by transmitting and receiving information to and from the driving wheel unit 210, the turn driving unit 212, the arm unit 220, the sensor unit 230, and the memory 240. The moving robot 100 autonomously moves along a planned moving path to a target position or moves in accordance with an instruction from a user regarding the moving direction while autonomously avoiding the obstacle. In this case, the moving robot 100 acquires the information on the step on the traveling path from the environmental map information read from the environmental map DB 241, the acquired information by processing an image signal obtained from the camera 114, or the sensor information obtained via the sensor unit 230. That is, the controller 200 serves as an acquisition unit that acquires the information on the step on the traveling path in collaboration with at least one of the environmental map DB 241, the camera 114, and the sensor unit 230.

Figure 3:
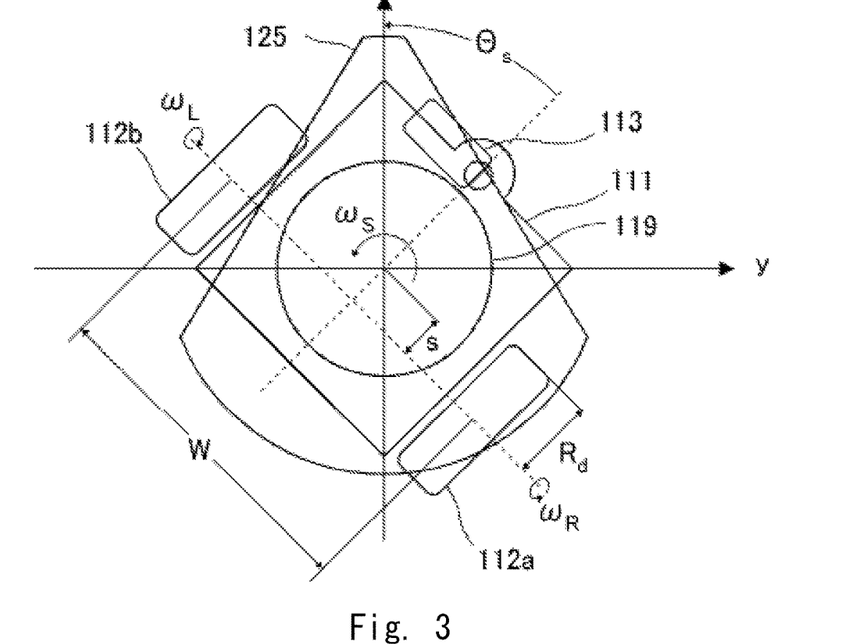
FIG. 3 is a diagram for describing an active caster control.

Next, the movement control of the moving robot 100 will be described. As to the movement control of the moving robot 100, two types of control modes, i.e., an active caster movement control (in the following description, this control is called an "active caster control") in which the cart part 110 can be moved omnidirectionally while maintaining the posture of the upper body part 120, and an opposing two-wheel movement control (in the following description, this control is called an "opposing two-wheel control") in which the moving robot 100 is moved in such a way that the driving wheels 112 are positioned on the front side of the cart base 111 with respect to the traveling direction, are employed. FIG. 3 is a diagram for describing the active caster control.

In the active caster control, the relative positional relation between the driving wheels 112 and the caster 113 with respect to the traveling direction is not constrained. In the normal traveling, the caster 113 is often located on the front side of the cart base 111 and the driving wheels 112 are often located on the rear side with respect to the traveling direction. As shown in FIG. 3, the right driving wheel when the caster 113 is disposed on the front side is referred to as a right driving wheel 112a and the left driving wheel is referred to as a left driving wheel 112b.

As shown in FIG. 3, the angular velocity of the right driving wheel 112a is denoted by $\omega_R$, the angular velocity of the left driving wheel 112b is denoted by $\omega_L$, the radius of each of the right and left driving wheels 112a and 112b is denoted by $R_d$ (same), the spacing (tread) between the right driving wheel 112a and the left driving wheel 112b is denoted by W, the offset amount between the rotary center and the driving wheel axle is denoted by s, the relative angle between the upper body base 125 and the cart base 111 is denoted by $\theta_S$, and the turning angular velocity, which is the change rate thereof, is denoted by $\omega_S$. At this time, when the velocity in the x-axis direction is expressed by x dot and the velocity in the y-axis direction is expressed by y dot, the following Expression (1) is established.

[Expression 1]

$$J = \begin{bmatrix} \frac{R_d}{2}\cos\theta_s - \frac{R_d s}{W}\sin\theta_s & \frac{R_d}{2}\cos\theta_s + \frac{R_d s}{W}\sin\theta_s & 0 \\ \frac{R_d}{2}\sin\theta_s + \frac{R_d s}{W}\cos\theta_s & \frac{R_d}{2}\sin\theta_s - \frac{R_d s}{W}\cos\theta_s & 0 \\ \frac{R_d}{W} & -\frac{R_d}{W} & 1 \end{bmatrix} \quad (1)$$

$$\begin{bmatrix} \omega_R \\ \omega_L \\ \omega_s \end{bmatrix} = J^{-1} \begin{bmatrix} \dot{x} \\ \dot{y} \\ \dot{\theta}_s \end{bmatrix}$$

While a transformation matrix J is a function of $\theta_S$, an inverse matrix $J^{-1}$ can be calculated regardless of the value of this angle. This shows that in this control there is no singularity and the calculation in the forward direction and that in the rearward direction are always possible. That is, it is understood that the active caster control is holonomic control. When the autonomous moving body employs the holonomic control, the number of moving paths that may be employed increases, which results in the degree of freedom of movement being greatly improved. Accordingly, the moving robot 100 according to this embodiment employs, in the normal traveling, the active caster control, which is the holonomic control.

In the active caster control, when the driving wheels 112 are driven, as stated above, typically, the caster 113, which is the trailing caster, is often located on the front side of the traveling direction. When the caster 113 is located on the front side of the traveling direction, it becomes more difficult for the moving robot 100 to pass over the step on the traveling path.

Figure 4:
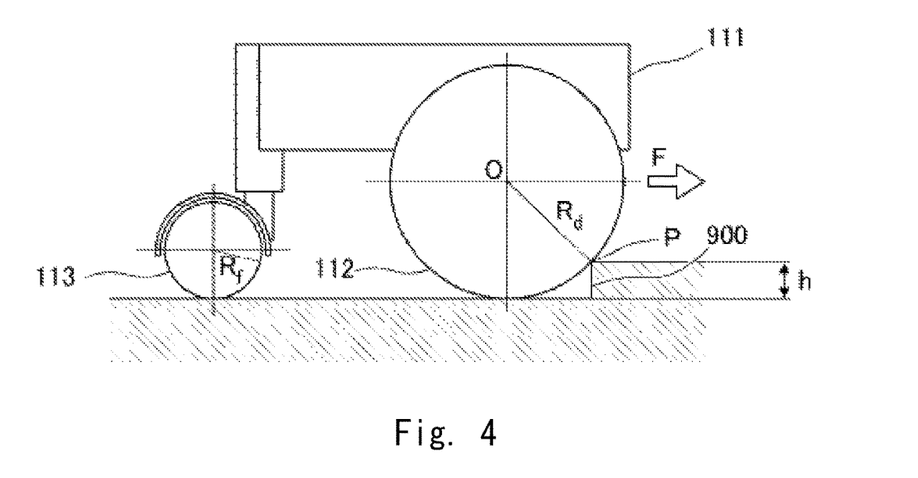
FIG. 4 is a diagram for describing surmountability of a step.

The surmountability, which is a property for passing over a step, will now be described. FIG. 4 is a diagram for describing the surmountability of the step 900. In FIG. 4, the cart part 110 is extracted and the relation between the cart part 110 and the step 900 is schematically shown.

A condition in which the driving wheels 112 can pass over the step 900 when the height of the step 900 on the traveling path is h is considered (in this example, the inertia force is ignored). When the reference point at which the driving wheels 12 contact the step 900 is denoted by P and the center of gravity applied to the driving wheels is denoted by mg, a moment $M_g$ generated in P by the center of gravity applied to the driving wheels 112 is expressed by the following Expression (2).

[Expression 2]

$$M_g = mg\sqrt{h(2R_d-h)} \quad (2)$$

Further, when the propulsion force of the driving wheels 112 is denoted by F, a moment $M_F$ generated in P by F is expressed by the following Expression (3).

[Expression 3]

$$M_F = (R_d-h)F \quad (3)$$

In order to allow the driving wheels 112 to pass over the step 900, MF>Mg needs to be satisfied. The symbol F that satisfies this condition is expressed by the following Expression (4).

[Expression 4]

$$F > \frac{mg\sqrt{h(2R_d-h)}}{R_d-h} \quad (4)$$

The condition in which the caster 113 passes over the step when the caster 113 contacts the step 900 before the driving wheels 112 contact the step 900 may be obtained by replacing $R_d$ in Expression (4) by a radius $R_f$ of the caster 113. When $R_f$ is smaller than $R_d$ like in this embodiment, it is understood from Expression (4) that F for passing over the step 900 becomes large. That is, the propulsion force that is necessary to pass over the step becomes larger when the caster 113 passes over the step than that when the driving wheels 112 pass over the step. In other words, the propulsion force becomes smaller and the step 900 can be passed over more smoothly when the driving wheels 112 pass over the step 900 than the case in which the caster 113 passes over the step 900. That is, the surmountability is higher in the former case. Further, since the propulsion force is generated by the driving wheels 112, it becomes easier for the moving robot 100 to pass over the step 900 by the driving wheels 112 with regard to obtaining the propulsion force more directly. When a constraint condition that the driving wheels 112 are located on the front side of the traveling direction compared to the caster 113 is added, however, the control becomes nonholonomic control, and the degree of freedom of movement is reduced.

In order to solve the aforementioned problem, the moving robot 100 according to this embodiment travels in the active caster control in which the caster 113 is often located on the front side of the traveling direction in the normal traveling, and when the moving robot 100 passes over the step, the direction is changed so that the driving wheels 112 are located on the front side of the traveling direction to switch the control mode to the opposing two-wheel control. That is, when the controller 200 recognizes that there is no step in the traveling direction, the controller 200 controls the driving wheels 112 by allowing the caster 113 to be located on the front side of the cart base 111 with respect to the traveling direction, and when the controller 200 recognizes that there is a step in the traveling direction, the controller 200 controls the driving wheels 112 in such a way that the orientation of the cart base 111 is changed and the driving wheels 112 approach the step so that at least one of the two driving wheels 112 contacts the step before the caster 113 contacts the step.

Figure 5:
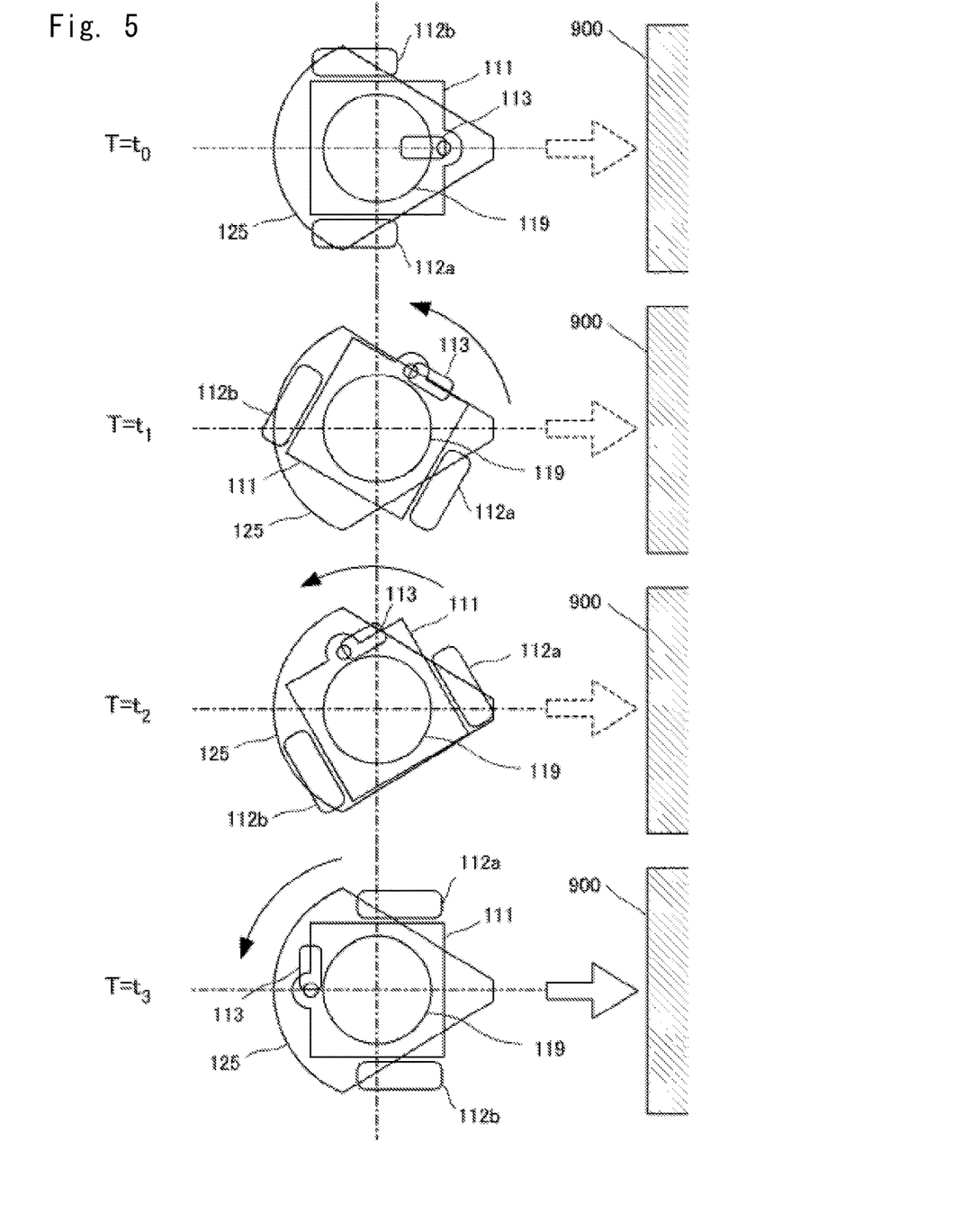
FIG. 5 is a diagram showing a state of direction change before the moving robot passes over the step.

The approach to the step under the control that involves the direction change will be described. FIG. 5 is a diagram showing a state of the direction change before the moving robot 100 passes over the step. FIG. 5 shows a state in which the cart base 111 turns in the counterclockwise direction with respect to the upper body base 125 with time from top to bottom.

When the moving robot 100 that has moved along the moving path by the active caster control recognizes, at time $T=t_0$, that the step 900 exists within a predetermined distance of the traveling direction, the moving robot 100 starts the direction change. When the moving robot 100 starts the direction change, the straight-ahead movement toward the step 900 is temporarily stopped.

The controller 200 rotates the right driving wheel 112a in the forward direction and the left driving wheel 112b in the rearward direction via the driving wheel unit 210 and turns the cart base 111 in the counterclockwise direction with respect to the traveling surface. In synchronization therewith, the controller 200 performs control to turn the upper body base 125 in the clockwise direction via the turn driving unit 212 so that the upper body base 125 is relatively stopped with respect to the traveling surface.

FIG. 5 shows a state in which the cart base 111 turns by 60 degrees with respect to the traveling direction at time $T=t_1$ and turns by 120 degrees at time $T=t_2$. At time $T=t_3$, the cart base 111 turns by 180 degrees with respect to the traveling direction and the direction change is completed. When the direction change is completed, in the cart base 111, the right driving wheel 112a and the left driving wheel 112b are closer to the step 900 than the caster 113 is. The controller 200 switches, in this state, to the opposing two-wheel control and re-starts the straight-ahead movement toward the step 900. The moving robot 100 now approaches the step 900 in such a way that the driving wheel which is on the left side with respect to the traveling direction becomes the right driving wheel 112a and the driving wheel which is on the right side with respect to the traveling direction becomes the left driving wheel 112b. At this time, throughout the operation of changing directions, the posture of the upper body base 125 with respect to the traveling direction is maintained.

Figure 6:
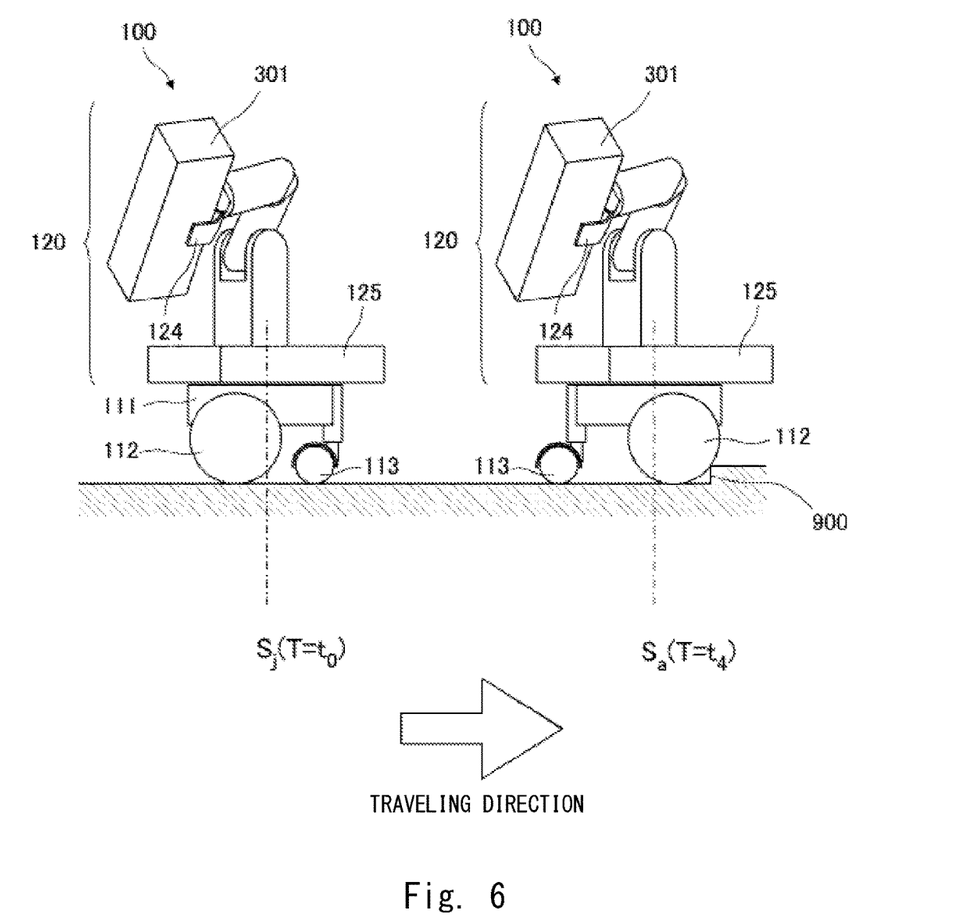
FIG. 6 is a diagram showing a state in which the moving robot approaches the step.

FIG. 6 is a diagram showing a state in which the moving robot 100 approaches the step 900. FIG. 6 shows both a state of the moving robot 100 at a position $S_j$ at which the direction of the cart base 111 is changed and a state of the moving robot 100 at a position $S_a$ at which the moving robot 100 tries to pass over the step 900. The state at the position $S_j$ corresponds to the state at time $T=t_0$ in FIG. 5 and the state at the position $S_a$ corresponds to the state at time $T=t_4$, which is a state after the moving robot 100 performs the straight-ahead movement toward the step 900 after the state at time $T=t_3$ shown in FIG. 5. In the examples of FIGS. 5 and 6, the moving robot 100 stops when it has recognized the step 900, changes its direction on site, and then goes toward the step 900. However, when the distance from the position where the step 900 is recognized to the step 900 is larger than a predetermined distance, the direction change and the approach to the step 900 may be performed at the same time. That is, the controller 200 may control the driving wheels 112 so that the moving robot 100 comes close to the step 900 while changing the orientation of the cart base 111.

As stated above, throughout the operation of changing directions, the posture of the upper body base 125 with respect to the traveling direction is maintained. Therefore, even when the hand 124 is carrying an object 301 as shown in FIG. 6, the posture of the whole upper body part 120 including the object 301 with respect to the traveling direction is maintained. That is, even when the active caster control is switched to the opposing two-wheel control, the posture of the upper body part 120 with respect to the traveling direction is always maintained. That the posture of the upper body part 120 is maintained is advantageous since it becomes easy to perform determination of contact with the obstacle calculated prior to the traveling and it becomes possible to avoid unexpected contact with the obstacle during traveling.

When the moving robot 100 has recognized the step by the environmental map stored in the environmental map DB 241, the moving robot 100 is able to safely change the directions in a position spaced apart from the step. On the other hand, when the step is recognized by the sensor or the like in real time, it is possible that the moving robot 100 may recognize the step when it is just in front of the step. In front of the step, it is possible that there may be no space for safely changing the directions. While the moving robot 100 according to this embodiment is able to perform a pivot turn around the rotary center of the turning mechanism 119, often moving robots have a structure in which the turning radius does not become zero even when the moving robots turn on site. In summary, the space that is necessary for the moving robot to change its directions varies for each moving robot.

Figure 7A:
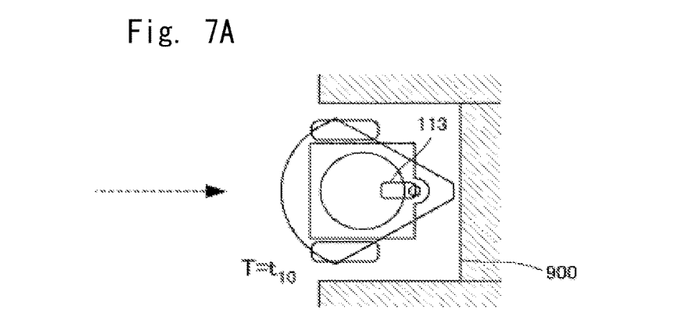
FIG. 7(a)-FIG. 7(c) is a diagram showing a state of direction change when the moving robot cannot change directions in front of the step.
Figure 7B:
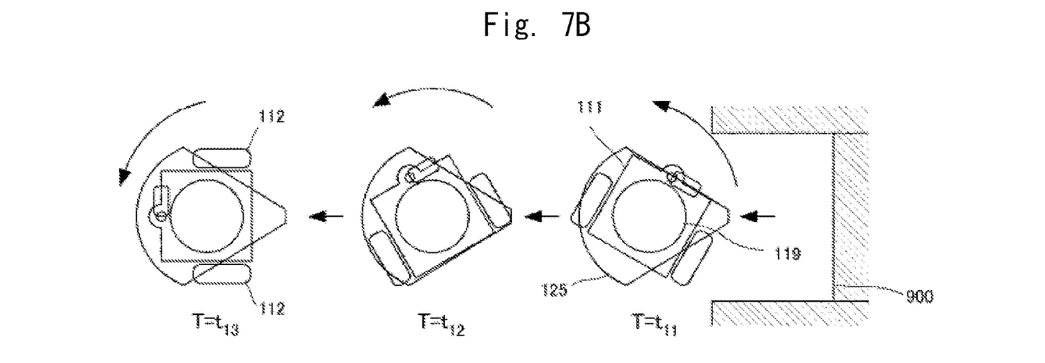
Figure 7C:
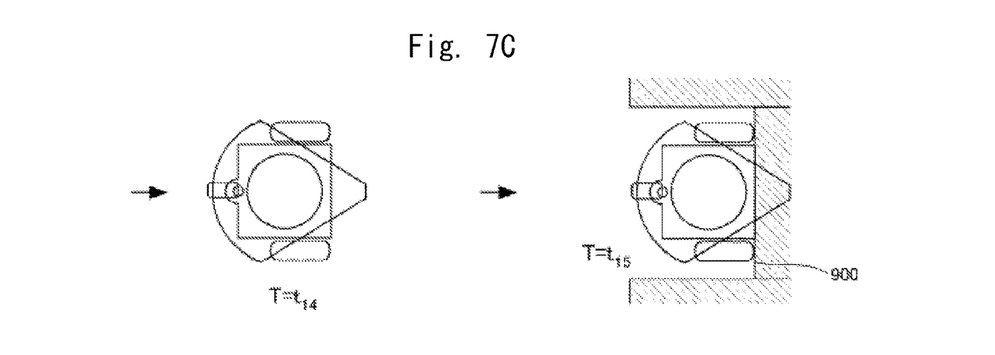

In view of the aforementioned discussion, control performed when there is no space for changing the directions at the position where the step is recognized will be described. FIG. 7(a)-FIG. 7(c) is a diagram showing a state of the direction change when the direction cannot be changed just in front of the step.

FIG. 7(a) shows a state in which the moving robot 100 approaches the step 900 and the step 900 is recognized at time $T=t_{10}$. Up until $T=t_{10}$, the moving robot 100 travels with the caster 113 located on the front side of the traveling direction by the active caster control. At $T=t_{10}$, the moving robot 100 is temporarily stopped.

When the moving robot 100 recognizes the step and determines, from, for example, the information from the sensor unit 230, that there is not a sufficiently large space for changing the directions, the moving robot 100 starts rearward movement, as shown in FIG. 7(b). When the moving robot 100 determines that there is no obstacle, which inhibits the turning, around the moving robot 100, the moving robot 100 turns the cart base 111 while moving rearward, and after T=$t_{11}$ and $t_{12}$, completes the direction change at T=$t_{13}$. The state of T=$t_{13}$ is a state in which the driving wheels 112 become orthogonal to the step 900.

After the direction change is completed, the control mode is switched to the opposing two-wheel control. As shown in FIG. 7(*c*), the moving robot 100 travels straight ahead toward the step 900, and after T=$t_{14}$, approaches the step 900 at T=$t_{15}$. After the above process, the moving robot 100 tries to pass over the step 900. In this way, the moving robot 100 may move rearward and change its directions in a place where there is a sufficiently large space, whereby the moving robot 100 is able to pass over the step by the opposing two-wheel control. When there is no space for changing the directions at the position where the moving robot 100 has recognized the step 900, the moving robot 100 may perform operations different from those stated above. That is, the moving robot 100 may first move rearward, perform only the direction change at the position where the space is secured, and then come close to the step 900 again. Alternatively, the moving robot 100 may perform only the rearward movement, perform the direction change while approaching the step 900 again, switch the control mode to the opposing two-wheel control when the direction change is completed, and approach the step 900.

The direction change described above is on the premise that the posture of the upper body part 120 is maintained. However, when it is not important to maintain the posture of the upper body part 120, i.e., when the posture of the upper body part 120 may be changed with respect to the traveling direction, another method of changing the directions may be employed.

Figure 8:
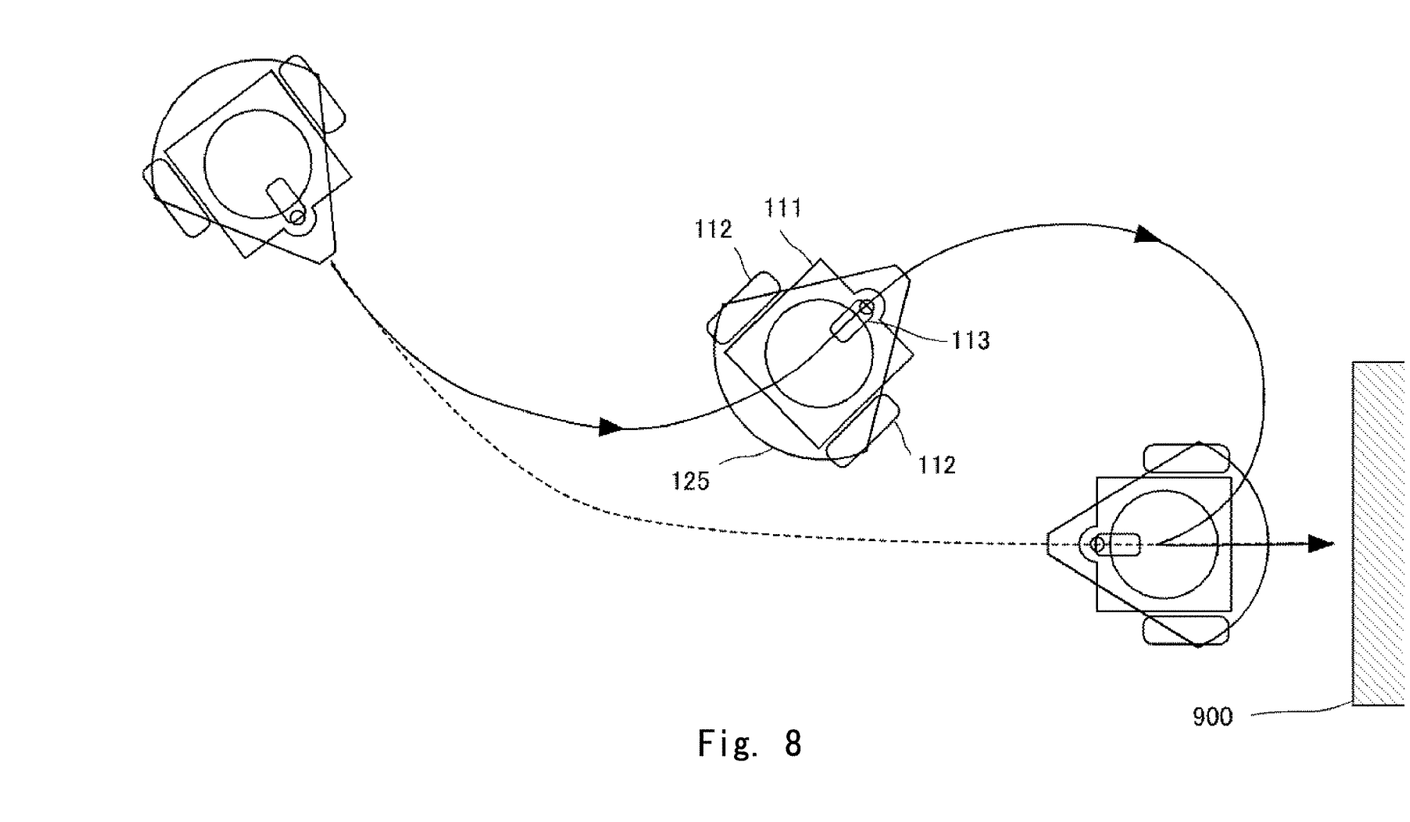
FIG. 8 is a diagram showing a state of direction change when a bypass can be secured before the moving robot reaches the step.

FIG. 8 is a diagram showing a state of the direction change when a bypass can be secured before the moving robot 100 reaches the step 900. It is assumed that the moving robot 100 has recognized the step 900 when a dotted path is planned as the optimal moving path. In this case, the bypass shown by a solid line is reset as the moving path unless a condition that the posture of the upper body part 120 including the upper body base 125 should be maintained is imposed. The moving robot 100 is able to cause the driving wheels 112 to be located on the front side of the traveling direction before the moving robot 100 reaches the step 900 by traveling along the bypass. Then the control mode is switched from the active caster control to the opposing two-wheel control and the moving robot 100 approaches the step 900.

That is, the controller 200 calculates whether it is possible to make the driving wheels 112 opposed to the step 900 before the moving robot 100 reaches the step 900, e.g., whether it is possible to form a bypass by connecting smooth arcs or whether it is possible to secure the bypass on the environmental map. When the bypass that has been formed can be secured, the moving robot 100 travels along the bypass, whereby the direction change can be achieved. After the direction change of the cart base 111 is completed, the upper body base 125 may be rotatably driven in such a way that the posture of the upper body part 120 becomes the original posture with respect to the traveling direction.

Figure 9:
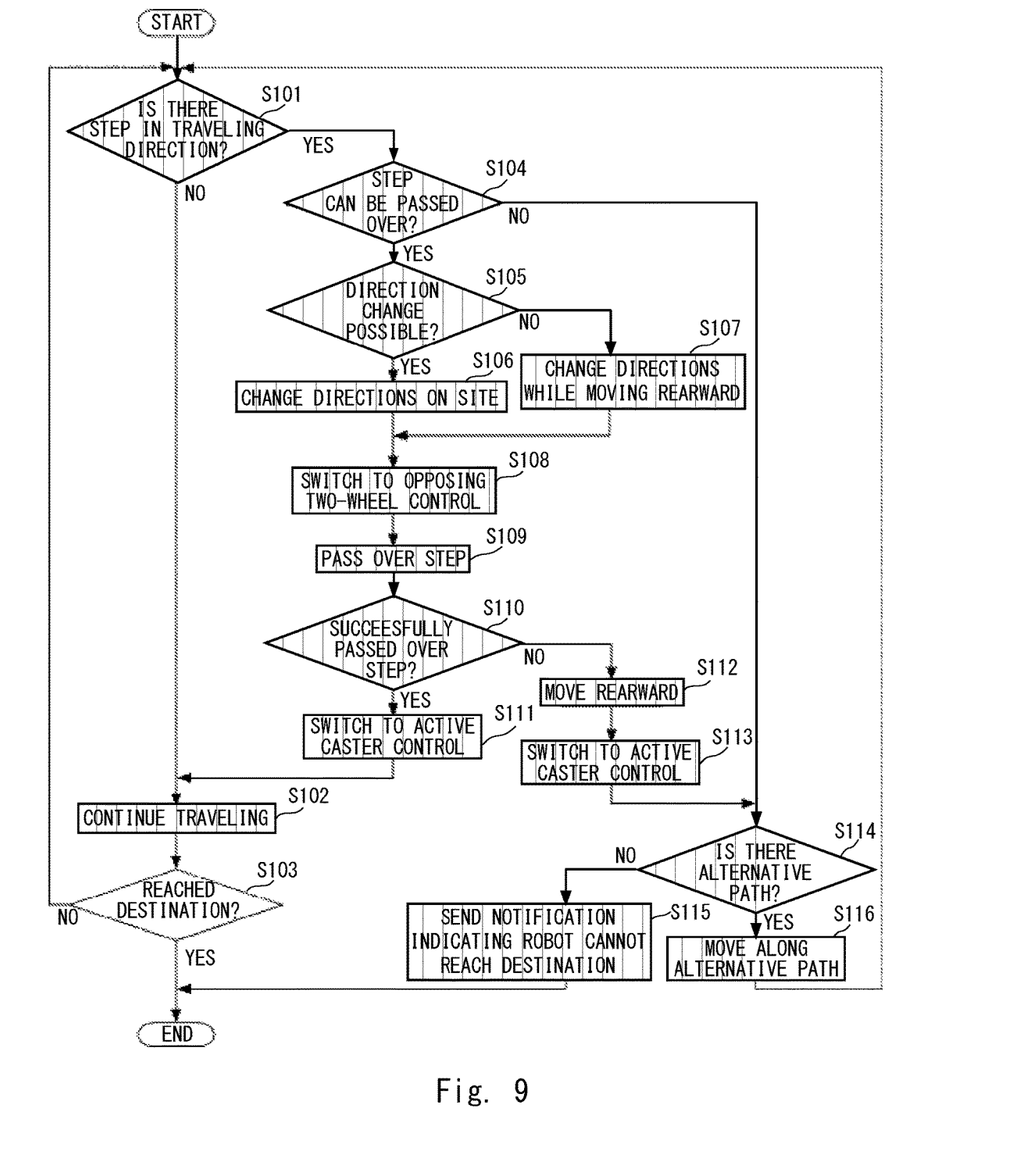
FIG. 9 is a flow diagram showing a procedure of operations executed by the moving robot.

Next, a procedure regarding the passing-over operation from the time at which the moving robot 100 is started to the time at which the moving robot 100 reaches the destination will be described. FIG. 9 is a flow diagram showing a procedure of operations executed by the moving robot 100 regarding the passing-over operation. The flow is started when the moving robot 100 starts moving.

The controller 200 acquires information on the step by continuously monitoring the environmental map read from the environmental map DB 241 and the signals from the sensor unit 230 and determines whether there is a step in the traveling direction (Step S101). As long as it is determined that there is no step, the process goes to Step S102, where the traveling is continued. Then it is determined whether the moving robot 100 has arrived at the destination by referring to the environmental map or the like (Step S103). When it is determined that the moving robot 100 has not yet arrived at the destination, the process goes back to Step S101. When it is determined that the moving robot 100 has arrived at the destination, the series of movement controls are ended.

When the controller 200 determines, in Step S101, that there is a step in the traveling direction, the process goes to Step S104, where it is determined whether the moving robot 100 is able to pass over the step. When the result of analysis of the image from the camera 114 shows that the height of the step is larger than a predetermined threshold, it is determined that the moving robot 100 is not able to pass over the step. The threshold is determined based on the height that the driving wheels 112 can pass over. Further, it is determined that it is impossible to pass over the step when the step has a predetermined feature, e.g., when there is a large difference in the height of the step with respect to the width direction of the moving robot 100.

When the controller 200 determines that it is impossible for the moving robot 100 to pass over the step, the process goes to Step S114, where it is determined whether there is an alternative path to the destination while avoiding the step by referring to the environmental map. When there is an alternative path, the moving robot 100 starts moving along the alternative path (Step S116) and the process goes back to Step S101. When there is no alternative path, the process goes to Step S15, where a notification indicating that the moving robot 100 cannot reach the destination is sent. The notification indicating that the moving robot 100 cannot reach the destination is sent to the user by, for example, voice or is displayed on a terminal held by the user. After the moving robot 100 has sent the notification indicating that the moving robot 100 cannot reach the destination, it ends the movement.

When the controller 200 determines in Step S104 that it is possible for the moving robot 100 to pass over the step, then the process moves to Step S105, where it is determined whether there is a space for changing the directions to locate the driving wheels 112 on the front side with respect to the traveling direction. Specifically, it is determined whether there is an obstacle around it using the signals or the like from the sensor unit 230. When it is determined that there is a space, the process moves to Step S106, where the direction change is executed on site as described with reference to FIGS. 5 and 6. When it is determined that there is no space, then the process moves to Step S107, where the moving robot 100 executes the direction change while moving rearward as described with reference to FIG. 7(*a*)-FIG. 7(*c*).

When the direction change in Step S106 or S107 is completed, the controller 200 moves to Step S108, where the control system is switched from the active caster control to the opposing two-wheel control. Specifically, the controller 200 makes a control plan of the path through which the driving wheels 112 may travel to allow the driving wheels 112 to pass over the step by the opposing two-wheel control. In Step S109, the moving robot 100 approaches the step in accordance with the plan that has been made and tries to pass over the step.

The controller 200 determines in Step S110 whether the moving robot 100 has successfully passed over the step. Whether the moving robot 100 has passed over the step is determined, for example, by checking whether the motor torque for driving the driving wheels 112 has made back to a range where the moving robot 100 travels on the plane surface after a predetermined period of time, by comparing the surrounding obstacle that has been recognized with the environmental map or by extracting the position of the step from an image captured by the camera 114 located on the rear side with respect to the traveling direction. When it is determined that the moving robot 100 has successfully passed over the step, the process goes to Step S111. The control mode is switched back to the active caster control and then the process goes to Step S102, where the traveling is continued.

When the controller 200 determines in Step S110 that the moving robot 100 has not successfully passed over the step, the process goes to Step S112, where the moving robot 100 moves rearward from the step. Then the control mode is switched again to the active caster control, and the process goes to Step S114, where an alternative path is searched.

The control flow described above is merely one example and various types of control flows may be employed. The direction change by the bypass described with reference to FIG. 8 may be, for example, employed. In this case, the controller 200 may execute the direction change by the bypass by determining whether it is specified to maintain the posture of the upper body part 120. Further, while the aforementioned control flow is based on the premise that the control mode is switched to the opposing two-wheel control when the moving robot 100 passes over the step, this premise may be changed depending on the state of the step.

Figure 10:
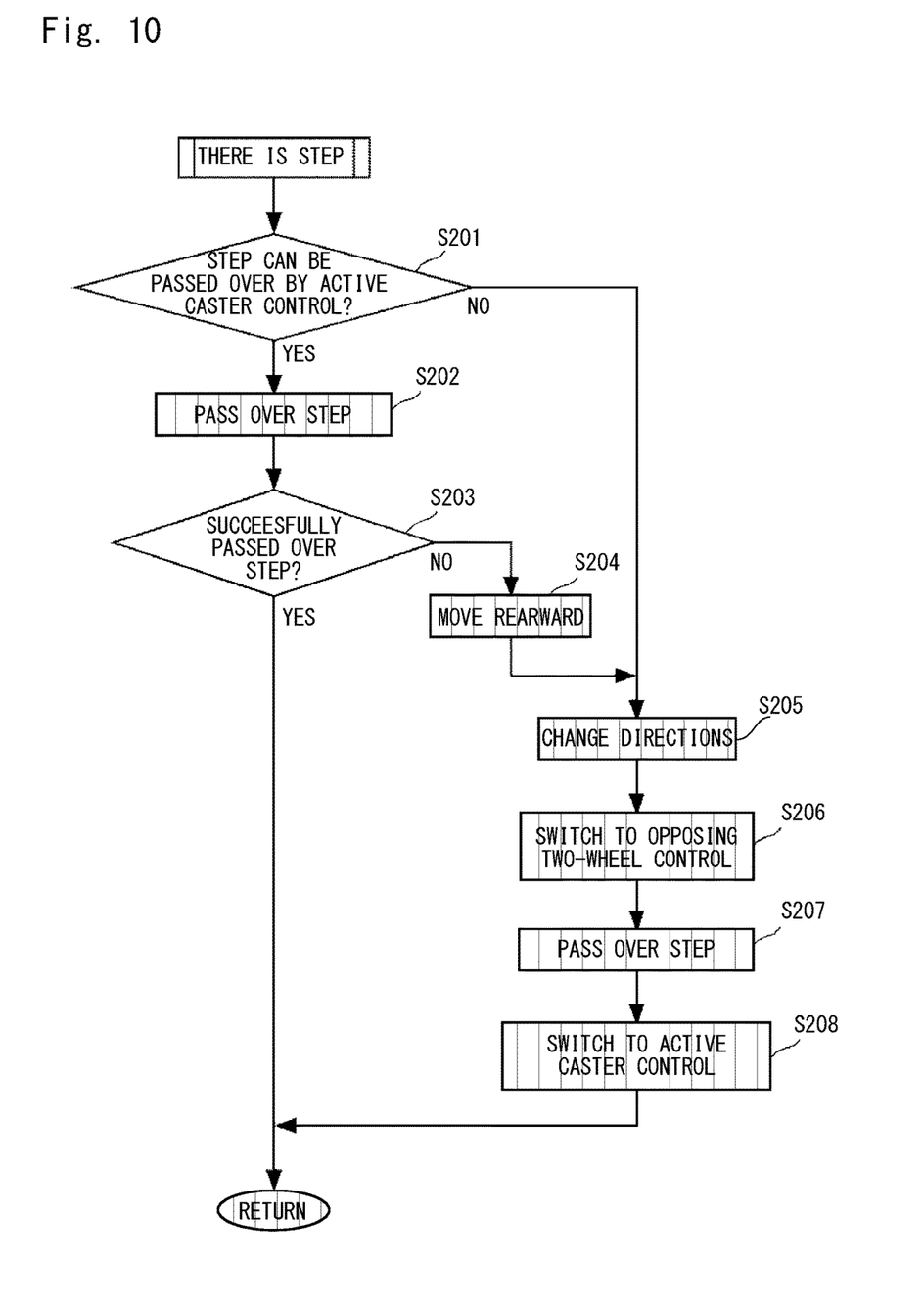
FIG. 10 is a flow diagram showing a modified example of control for passing over the step.

Further, a modified example will be described. FIG. 10 is a flow diagram showing a modified example of control for passing over the step. Specifically, FIG. 10 shows a procedure in place of Steps S104 to S111 shown in FIG. 9.

When the controller 200 determines that there is a step in the traveling direction, the controller 200 determines, in S201, whether the moving robot 100 is able to pass over the step while keeping the active caster control. The height of the step, the radius of the caster 113, F or the like obtained from the propulsion force of the driving wheels 112 are substituted, for example, into the aforementioned Expression (4), and when the Expression is established, it is determined that the moving robot 100 is able to pass over the step. When it is determined that the moving robot 100 is able to pass over the step, the process moves to Step S202, where the moving robot 100 tries to pass over the step. Then it is determined in Step S203 whether the moving robot 100 has successfully passed over the step. The method of the determination is similar to that in Step S110. When it is determined that the moving robot 100 has successfully passed over the step, the process goes to Step S102.

When the controller 200 determines in Step S201 that the moving robot 100 cannot pass over the step in the active caster control, the process goes to Step S205. Further, when it is determined in Step S203 that the moving robot 100 has failed in passing over the step, the moving robot 100 moves rearward in Step S204 and then the process goes to Step S205.

In Step S205, the controller 200 executes the direction change. As a matter of course, prior to executing the direction change, the determination in Step S105 may be performed. Then the control mode is switched to the opposing two-wheel control (Step S206), and the moving robot 100 approaches and passes over the step (Step S207). As a matter of course, besides the determination regarding whether the moving robot 100 has successfully passed over the step like the determination in Step S110, a process when the moving robot 100 has failed in passing over the step may be added. When the moving robot 100 has passed over the step, the control mode is made back to the active caster control in Step S208, and then the process goes to Step S102.

Figure 11:
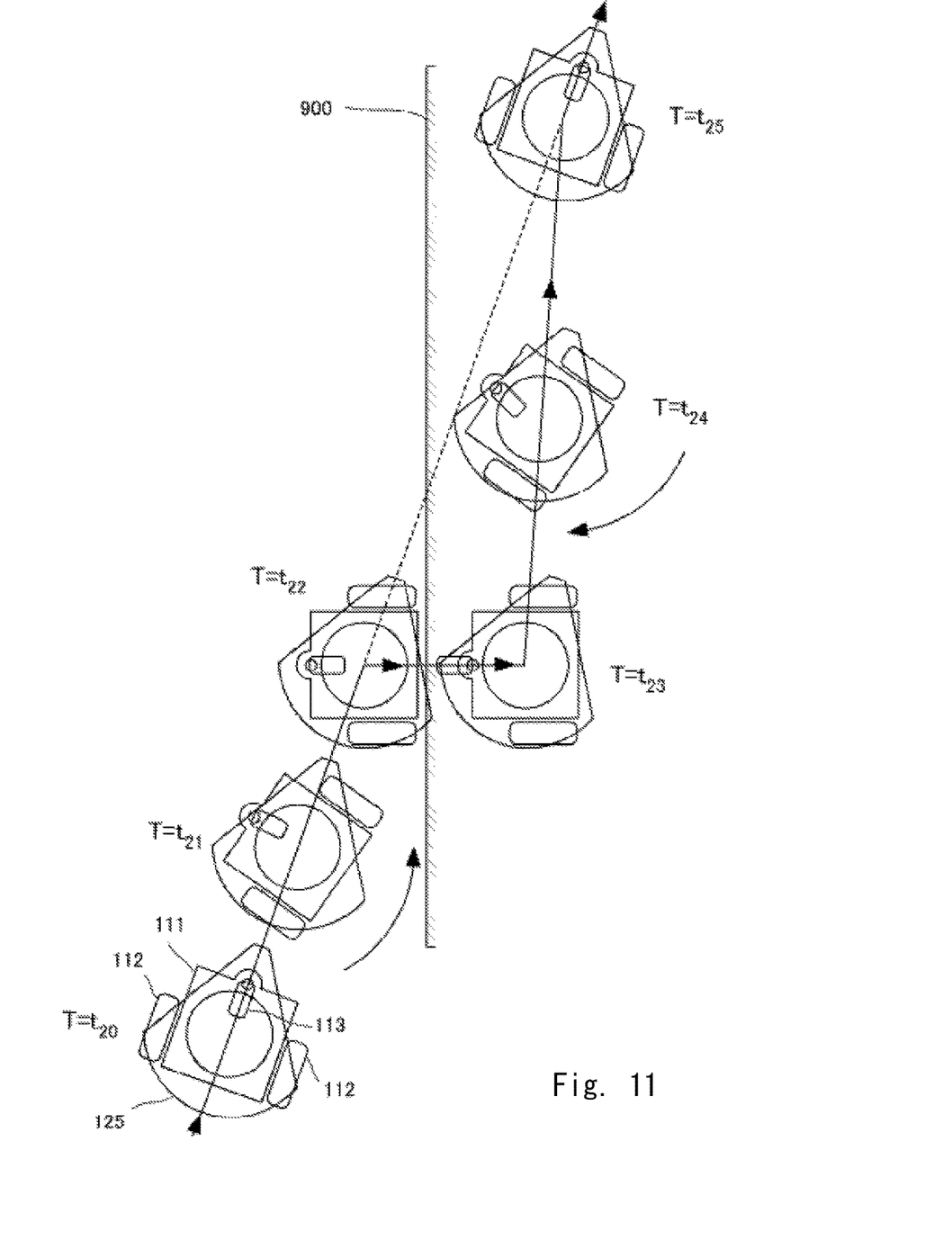
FIG. 11 is a diagram showing a state in which the moving robot passes over the step when the step crosses a moving path in an oblique manner.

While the case in which the step is orthogonal to the moving path of the moving robot 100 has been described in the aforementioned embodiment and the modified example, the step is not always orthogonal to the moving path. Next, a case in which the step crosses the moving path in an oblique manner will be described. FIG. 11 is a diagram showing a state in which the moving robot 100 passes over the step when the step crosses the moving path in the oblique manner.

Assume that the moving robot 100 recognizes the step 900 that crosses the moving path in the oblique manner at time $T=t_{20}$ when a path shown by the dotted line is planned as the optimal moving path. The controller 200 starts the direction change of the cart base 111 from $T=t_{20}$. Since the direction change in this case involves the straight-ahead motion along the planned moving path, the turning control in which the translational component is added to the rotational component as shown in FIG. 7(b) is achieved.

When the directions are changed, instead of turning the moving robot 100 by 180 degrees as described above, the moving robot 100 is turned in such a way that the two driving wheels 112 become orthogonal to the step 900. After time $T=t_{21}$, the moving robot 100 is oriented in such a way that the two driving wheels 112 become orthogonal to the step 900 at time $T=t_{22}$.

When the two driving wheels 112 become orthogonal to the step 900, the controller 200 controls the moving robot 100 in such a way that the moving robot 100 is deviated from the original moving path and moves straight forward to the step 900 by the opposing two-wheel control. That is, the moving robot 100 changes its way to the path orthogonal to the step and the moving body approaches the step.

When it is determined at time $T=t_{23}$ that the moving robot 100 has successfully passed over the step, the controller 200 plans the path from this position back to the original moving path. Specifically, the controller 200 plans the path that causes the moving robot 100 to promptly return to the original moving path by combining the rotational motion and the straight-ahead motion of the cart base 111 in such a way that the moving robot 100 can travel along the original moving path by the active caster control. Time $T=t_{24}$ shows a state in which the moving robot 100 moves along the path that has been planned as stated above. At time $T=t_{25}$, the moving robot 100 returns to the original moving path, the control mode is switched to the active caster control, and the traveling is continued toward the destination. According to such a control, the moving robot 100 is able to pass over the step 900 more certainly.

The controller 200 may control the upper body base 125 in such a way that the upper body base 125 consistently maintains the posture with respect to the traveling direction when the moving robot 100 travels along the original moving path as shown in FIG. 11. According to such a control, it is possible to reduce an unexpected contact of the moving robot with the obstacle.

In the embodiment and the modified example described above, after the moving robot 100 changes its direction in such a way that the two driving wheels 112 become orthogonal to the step 900, the driving wheels 112 come close to the step, and these two driving wheels 112 contact the step substantially at the same time, and then they pass over the step. However, as described above with reference to FIG. 4, it is more advantageous that the driving wheels contact the step before the caster contacts the step as regards the improvement of the surmountability. Thus it can be said that the two driving wheels may not concurrently contact the step. Therefore, depending on the relation between the moving path and the direction of the step, the cart base 111 may be oriented in such a way that one driving wheel 112 contacts the step before the caster 113 contacts the step.

It should be noted that the order of executing processes, such as actions, procedures, steps, and phases in the devices, systems, programs, and methods described above in the embodiment may be performed in any order unless specifically stated as "before", "prior to", or the like, and unless output from the preceding process is used in the subsequent process. "First", "then" or the like, even if used for convenience, do not mean that execution in the described order is essential.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An autonomous moving body comprising:
   two driving wheels that are rotationally driven independently from each other;
   at least one trailing caster;
   a base body in which the two driving wheels and the trailing caster are disposed;
   a controller that controls the rotational driving of the driving wheels; and
   an acquisition unit that acquires information on a step on a traveling path;
   wherein the controller controls the driving wheels by allowing the trailing caster to be located on a front side of the base body with respect to a traveling direction when the controller has recognized as a result of the acquisition of the information by the acquisition unit that there is no step in the traveling direction, and controls the driving wheels to change the orientation of the base body and approach the step so that at least one of the two driving wheels contacts the step before the trailing caster contacts the step when the controller has recognized that there is a step in the traveling direction.

2. The autonomous moving body according to claim 1, wherein, when the controller has recognized that the height of the step recognized in the traveling direction is equal to or larger than a predetermined height, the controller controls the driving wheels to change the orientation of the base body and approach the step so that at least one of the two driving wheels contacts the step before the trailing caster contacts the step.

3. The autonomous moving body according to claim 1, wherein, when the controller determines that it is impossible to change the orientation of the base body at the position where the step has been recognized in the traveling direction, the controller controls the driving wheels in such a way that the moving body moves rearward, the orientation of the base body is changed and the driving wheels approach the step so that at least one of the two driving wheels contacts the step before the trailing caster contacts the step.

4. The autonomous moving body according to claim 1, wherein, when a distance from the position at which the step has been recognized in the traveling direction to the step is larger than a predetermined distance, the controller controls the driving wheels in such a way that the driving wheels come close to the step while changing the orientation of the base body so that at least one of the two driving wheels contacts the step before the trailing caster contacts the step.

5. The autonomous moving body according to claim 1, wherein, when the controller determines that a bypass can be secured from the position at which the step has been recognized in the traveling direction to the step, the controller controls the driving wheels in such a way that the driving wheels come close to the step while changing the orientation of the base body so that at least one of the two driving wheels contacts the step by way of the bypass before the trailing caster contacts the step.

6. The autonomous moving body according to claim 1, wherein, when the moving body approaches the step recognized in the traveling direction without changing the orientation of the base body but could not pass over the step, the controller controls the driving wheels in such a way that the moving body moves rearward, the orientation of the base body is changed and the driving wheels reapproach the step so that at least one of the two driving wheels contacts the step before the trailing caster contacts the step.

7. The autonomous moving body according to claim 1, wherein, when a plan in which the moving body moves along a route that crosses the step recognized in the traveling direction in an oblique manner is employed, the controller controls the driving wheels to partially correct the plan to a route orthogonal to the step to cause the moving body to pass over the step.

8. The autonomous moving body according to claim 7, wherein the controller controls the driving wheels to change the orientation of the base body during traveling along the route that crosses the step in the oblique manner, and to cause the driving wheels to move straight ahead along the route orthogonal to the step when the two driving wheels become orthogonal to the step.

9. The autonomous moving body according to claim 1, comprising an upper body part that is placed on the base body and is rotatably driven with respect to the base body,
   wherein, even when the orientation of the base body is changed in a case in which the controller recognizes that there is a step in the traveling direction, the controller performs control in such a way that the posture of the upper body part is maintained with respect to the traveling direction by relatively rotatably driving the upper body part with respect to the base body.

10. A movement control method of an autonomous moving body comprising two driving wheels that are rotationally driven independently from each other, at least one trailing caster, and a base body in which the two driving wheels and the trailing caster are disposed, the method comprising:
    acquiring information on a step on a traveling path; and
    controlling the driving wheels by allowing the trailing caster to be located on a front side of the base body with respect to a traveling direction when the controller has recognized as a result of the acquisition of the information that there is no step in the traveling direction, and controls the driving wheels to change the orientation of the base body and approach the step so that at least one of the two driving wheels contacts the step before the trailing caster contacts the step when the controller has recognized that there is a step in the traveling direction.

* * * * *